United States Patent Office
3,292,437
Patented Dec. 20, 1966

3,292,437
VIBRATING CORD ACCELEROMETERS
Raymond Mathey and Jean Louis Vernet, Paris, France, assignors to CSF-Compagnie Generale de Telegraphie Sans Fil, a corporation of France
Filed Oct. 2, 1963, Ser. No. 313,296
Claims priority, application France, Oct. 5, 1962, 911,423
4 Claims. (Cl. 73—517)

The present invention relates to vibrating cords.

Linear vibrating cord accelerometers are well known in the art. Their mode of operation is based on the fact that the resonance frequency of a vibrating cord depends on the tension applied to it.

This tension varies under the action of acceleration to which the frame supporting the cord is subjected.

In certain types of such accelerometers the vibrating cord is supported at its two ends by the frame subjected to acceleration and carries a centrally placed weight. The direction of the cord is that of the acceleration to be measured. Under the action of the acceleration to be measured, this weight brings about, through its intertia, an additional tensioning of one part of the cord and reduces the tension of the other part to the same extent. The two parts of the cord being brought into vibration, it is possible to measure by a differential process the difference in the resonance frequency of the two cords, and consequently the acceleration.

Generally, the cords are caused to vibrate by an electromagnetic process requiring the use of permanent magnets, which are heavy and bulky.

It is an object of the invention to provide a vibrating cord accelerometer which is less bulky and lighter than known devices of this type.

The vibrating cord accelerometer according to the invention is characterized in that the body supported by the cords is itself a permanent magnet with an axial channel through which the cord extends.

According to a particular embodiment, this body consists of two identical permanent magnets surrounding a magnetically neutral part to whose sides the two portions of the vibrating cord are respectively attached, the cord extending in axial channels provided in the two permanent magnets.

Preferably the body carried by the cords has its ends attached to the frame by means of two elastic plates which are sufficiently thin to ensure that their vibration frequency, in the direction of the axis of the cord, is low compared to the longitudinal vibration frequency of the whole.

The invention will be better understood by means of the following description and appended drawings, in which.

Figure 1:
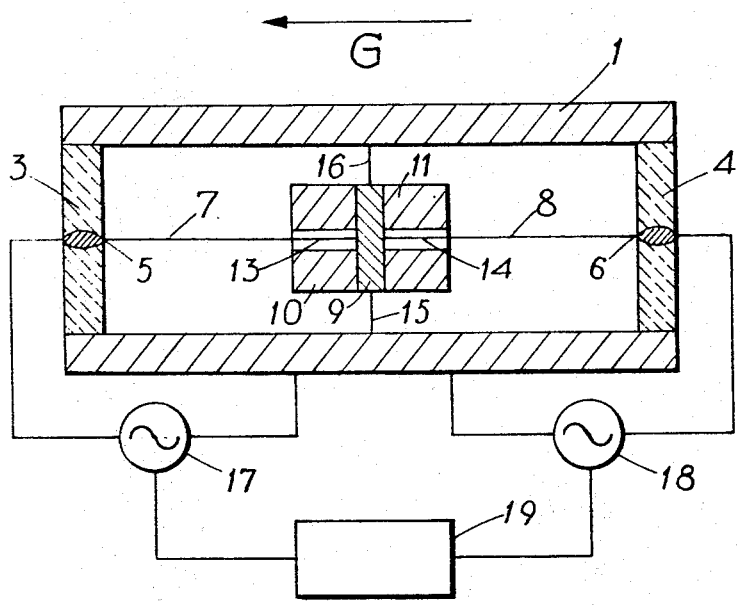
FIG. 1 is a linear vibrating cord accelerometer arrangement according to the invention.

FIG. 1 shows a hollow, cylindrical frame, closed at its two ends by dielectric plates 3 and 4. The two respective ends 5 and 6 of a vibrating cord are respectively fixed to plates 3 and 4. The vibrating cord is formed of two equal parts 7 and 8, which are welded at their opposed ends to a weight 9 of non-magnetic material. According to the invention, weight 9 is fixed to the two magnetic bodies 10 and 11 respectively provided with central channels 13 and 14 in prolongation of each other through which wires 7 and 8 respectively extend.

Weight 9 is supported by the frame by means of wires 15 and 16 perpendicular to the vibrating cord.

Wires 7 and 8 are respectively fed with alternating current by two sources 17 and 18 of adjustable frequency.

The whole is subjected to an acceleration $\vec{G}$ applied in the direction of the arrow. In the absence of acceleration, the two cords are assumed to be under the same tension F.

The system operates as follows:

Under the action of the accelerating force $\vec{G}$, cord 7, through the inertia of system 9–10–11, has its tension increased by an amount $\Delta F$, while cord 8 has its tension reduced of by $-\overrightarrow{\Delta F}$. The application of the alternating currents from sources 17 and 18 causes the two cords in the airgaps 13 and 14, to vibrate at the frequency of the two alternating currents, which are adjusted by known means 19 so that they are equal to the respective resonance frequencies $f_1$ and $f_2$ of wires 7 and 8.

In the absence of acceleration these two frequencies have the same value $f$. In the presence of acceleration, one has:

$$f_1 = f + \Delta f$$
$$f_2 = f - \Delta f$$

Thus, measurement of frequencies $f_1$ and $f_2$ gives $\Delta f$ and hence the acceleration $\vec{G}$.

The arrangement according to the invention thus permits doing away with the fixed permanent magnets, used in known accelerometers. The invention thus provides a signficant reduction of weight and size.

Figure 2:
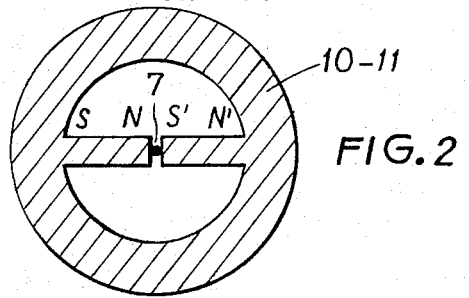
FIGS. 2 and 3 show, respectively in longitudinal and traverse sections, a first example of a weight arranged for being attached to the vibrating cord of an accelerometer according to the invention.
Figure 3:
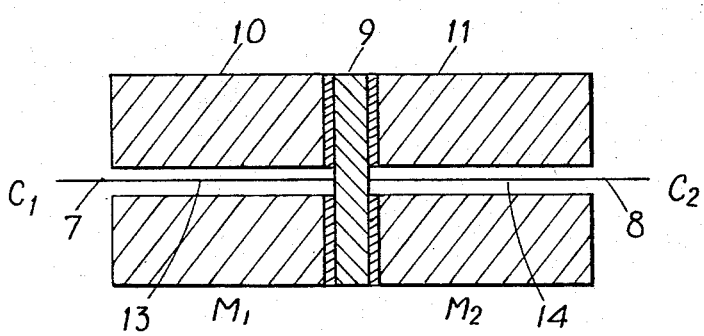

FIG. 2 and FIG. 3 shows, respectively in longitudinal and transverse sections, one example of realization of the system 9–10–11.

The two elements 10 and 11, which are shown in cross-section in FIG. 2, are two identical permanent magnets. They are hollow cylinders; the pole-pieces SN, S'N' extend along a common diametral plane.

Wire 7 is stretched in airgap 13, wire 8 in airgap 14.

Through the symmetry of the whole, the force $\vec{F}$ due to acceleration $\vec{G}$ is applied at the centre of gravity of the weight, which is the centre of gravity of the system 9–10–11. There is thus no risk of reversing torque.

Figure 4:
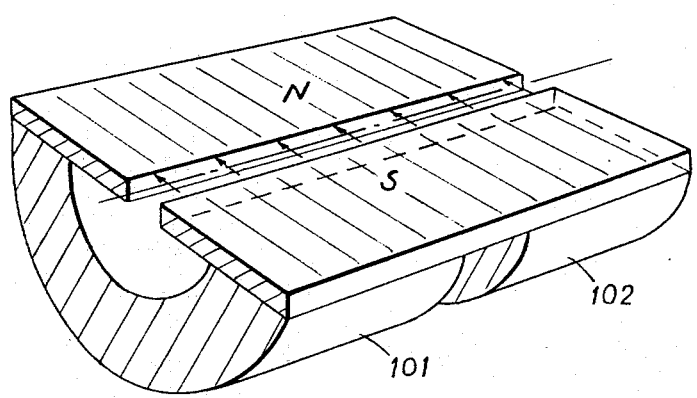
FIGS. 4 and 5 show, in perspective and in section, further examples of accelerometers according to the invention.
Figure 5:
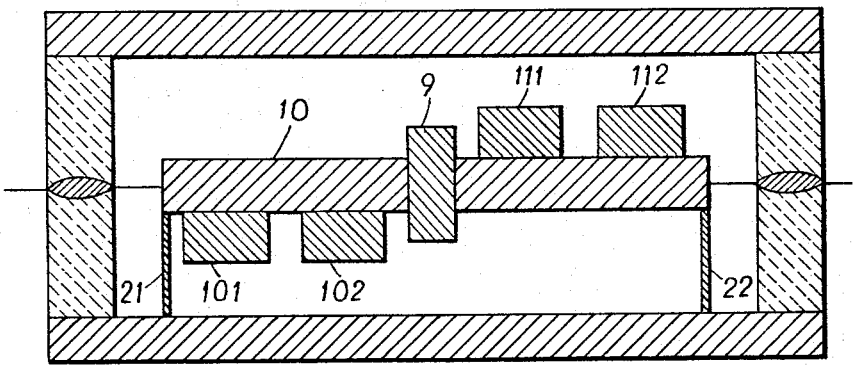

FIG. 4 shows in perspective an embodiment of weight. It consists of two semi-cylindrical elements 101 and 102 supporting two pole-pieces N and S, between which wire 7 is stretched. The system 9–10–11, shown in cross-section in FIG. 5, is so arranged that the overal centre of gravity lies at the centre of weight 9.

Elements 111 and 112 are symmetrical, with respect to element 9, to elements 101 and 102.

Figure 6:
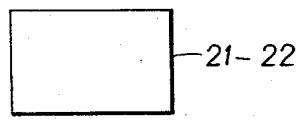
FIG. 6 shows a detail of the arrangement of FIG. 5.

The system 9–10–11 is supported by frame 1 and is mechanically decoupled from it by two plates 21 and 22, seen from the front in FIG. 6, placed respectively at its two ends.

These two plates are thin (0.1 mm.), and are made of a material with a very low thermo-electric coefficient, such as elinvar. They are made sufficiently thin to ensure that their natural vibration frequency in the direction $\vec{G}$ is small compared to the device's longitudinal vibration frequency, this in order to secure mechanical decoupling so as not to affect measurements.

They are sufficiently wide to avoid torsion vibration about the instrument's sensitive axis.

The arrangement according to the invention has the following advantages:

The two weights are chosen to obtain maximum magnetic field for minimum weight and size.

The system 9–10–11 is mechanically decoupled from the accelerometer frame.

The centre of gravity of the oscillating system 9–10–11 is situated on its sensitive axis (axis of wires 7 and 8), thus avoiding the presence of disturbing torques.

Measurements are made at high sensitivity. There is no risk of false information due to the presence of parts for mechanically decoupling the oscillating system from the frame.

Of course the invention is not limited to the embodiments shown which are given solely by way of example.

What is claimed is:

1. A vibrating cord accelerometer comprising in combination: a frame, a weight, two cord portions of conductive material, identical to each other, fixing said weight to said frame; said weight comprising two magnets, each having a pair of pole pieces forming a gap, one of the cord portions extending through one of the gaps, and the other cord portion extending through the other gap; means for connecting said cord portions to two electric alternating voltage sources having controllable frequencies, and means for tuning said frequencies, to the resonant frequencies of said cord portions respectively.

2. A vibrating cord accelerometer comprising in combination: a frame, a weight, two cord portions of conductive material, identical to each other, fixing said weight to said frame; said weight comprising two magnets, each having a pair of pole pieces forming a gap, and a central portion of nonmagnetic material joining said magnets together, one of the cord portions extending through one of the gaps, and the other cord portion extending through the other gap; means for connecting said cord portions to two electric alternating voltage sources having controllable frequencies, and means for tuning said frequencies, to the resonant frequencies of said cord portions respectively.

3. A vibrating cord accelerometer comprising in combination: a frame, a weight, two cord portions of conductive material, identical to each other, fixing said weight to said frame; said weight comprising two magnets, each having a pair of pole pieces forming a gap, and a central portion of nonmagnetic material joining said magnets together, one of the cord portions extending through one of the gaps, and the other cord portion extending through the other gap; said weight and said cord portions having a center of symmetry; means for connecting said cord portions to two electric alternating voltage sources having controllable frequencies and means for tuning said frequencies, to the resonant frequencies of said cord portions respectively.

4. A vibrating cord accelerometer comprising in combination: a frame, a weight, two cord portions of conductive material, identical to each other, fixing said weight to said frame; said weight comprising magnets, each having a pair of pole pieces forming a gap, and a central portion of nonmagnetic material joining said magnets together, one of the cord portions extending through one of the gaps, and the other cord portion extending through the other gap; said weight and said cord portions having a center of symmetry, said magnets being in the form of hollow rotational half cylinders, having two respective ends, two plates at said two ends secured to said frame, for supporting said magnets, said plates having a resonant frequency in the direction of said cord portions, small with respect to the resonance frequency of said cord portions; means for connecting said cord portions to two electric alternating voltage sources having controllable frequencies, and means for tuning said frequencies, to the resonant frequencies of said cord portions respectively.

References Cited by the Examiner

FOREIGN PATENTS 871,553   6/1961   Great Britain.

RICHARD C. QUEISSER, *Primary Examiner.*

JAMES J. GILL, *Assistant Examiner.*